United States Patent
Ikegami et al.

(10) Patent No.: US 7,532,624 B2
(45) Date of Patent: May 12, 2009

(54) MULTICAST PACKET CONTROL APPARATUS

(75) Inventors: Kozo Ikegami, Yokohama (JP); Takashi Yokoyama, Yokohama (JP); Minoru Nagai, Fujisawa (JP); Yoshitaka Sakamoto, Yokohama (JP); Shigehiro Onizawa, Yokohama (JP)

(73) Assignee: Hitachi Communication Technologies, Ltd, Tokyo (JP)

( * ) Notice: Subject to any disclaimer, the term of this patent is extended or adjusted under 35 U.S.C. 154(b) by 457 days.

(21) Appl. No.: 11/508,240

(22) Filed: Aug. 23, 2006

(65) Prior Publication Data
US 2007/0165633 A1    Jul. 19, 2007

(30) Foreign Application Priority Data
Jan. 13, 2006    (JP)    ............................... 2006-006029

(51) Int. Cl.
H04L 12/28    (2006.01)
(52) U.S. Cl. .................. 370/390; 370/395.42; 370/432; 370/468
(58) Field of Classification Search ................. 370/390, 370/432, 395.41, 395.42, 468
See application file for complete search history.

(56) References Cited

U.S. PATENT DOCUMENTS

2004/0090964 A1*    5/2004    Reed et al. ............... 370/395.4

2005/0281265 A1*   12/2005    Sakamoto et al. ........... 370/390

OTHER PUBLICATIONS

RFC1112, S. Deering, et al. Aug. 1989.
RFC2236, W. Fenner, et al. Nov. 1997.
RFC2710, S. Deering, et al. Oct. 1999.

* cited by examiner

Primary Examiner—Chirag G Shah
Assistant Examiner—Otis L Thompson, Jr.
(74) Attorney, Agent, or Firm—Brundidge & Stanger, P.C.

(57) ABSTRACT

When multicast distribution is performed on a network where a point-to-point connection is made between user terminals and a multicast router, the multicast router is protected from load due to response reports, join requests, or leave statements sent from the user terminals simultaneously. If the user terminals send response reports simultaneously, a Layer 2 switch disposed between the user terminals and the multicast router limits response reports sent to the multicast router. The Layer 2 switch prevents response reports sent from the same user terminal from being discarded consecutively, by sending a response report sent from the same user terminal to the multicast router 200 with priority in the next join confirmation event. If the user terminals send join requests or leave statements simultaneously, the Layer 2 switch limits the join requests or leave statements sent to the multicast router 200 in the same manner. The Layer 2 switch further enlarges a transmission buffer thereof at the multicast router side, so that the packets can be stored in the buffer.

10 Claims, 22 Drawing Sheets

| GROUP ADDRESS | USER TERMINAL IP ADDRESS | PORT NUMBER | CONSECUTIVE NO-RESPONSE COUNT |
|---|---|---|---|
| 224.10.10.10 | 10.10.10.10 | 1 | 0 |
| 224.10.10.10 | 20.20.20.20 | 1 | 1 |
| 224.10.10.10 | nn.nn.nn.nn | 1 | 0 |
| | | | |

FIG. 5

| IGMP TRANSMISSION BUFFER UTILIZATION RATE | TRANSFER RATE LIMITATION |
|---|---|
| UP TO 70% | NO LIMITATIONS |
| 70% OR HIGHER | UP TO 50 pps |
|  |  |

100-4-1-2 (left column), 100-4-1-3 (right column)

FIG. 6

| GROUP ADDRESS | TRANSMISSION-SOURCE MAC ADDRESS | DISCARD COUNT | PRIORITY LEVEL |
|---|---|---|---|
| 224.10.10.10 | 00-00-87-22-22-22 | 1 | 1 |
| | | | |
| | | | |

| GROUP ADDRESS | TRANSMISSION-SOURCE MAC ADDRESS | DISCARD COUNT | PRIORITY LEVEL |
|---|---|---|---|
| 224.10.10.10 | 00-00-87-22-22-22 | 2 | 1 |
| 224.10.10.10 | 00-00-87-11-11-11 | 1 | 2 |
|  |  |  |  |
|  |  |  |  |

Columns: 100-4-2-1, 100-4-2-2, 100-4-2-3, 100-4-2-4

FIG. 8

| IGMP TRANSMISSION BUFFER UTILIZATION RATE (100-4-3-2) | IGMP TRANSMISSION BUFFER SIZE (100-4-3-3) |
| --- | --- |
| UP TO 70% | 32 Kbytes |
| 70% OR HIGHER | 64 Kbytes |
|  |  |

FIG. 9

| GROUP ADDRESS | TRANSMISSION-SOURCE MAC ADDRESS |
|---|---|
| 224.10.10.10 | 00-00-87-22-22-22 |
|  |  |
|  |  |

100-4-4-1 (GROUP ADDRESS column), 100-4-4-2 (TRANSMISSION-SOURCE MAC ADDRESS column)

FIG. 10

| GROUP ADDRESS | IGMP TRANSMISSION BUFFER UTILIZATION RATE | TRANSFER RATE LIMITATION |
|---|---|---|
| 224.10.10.10 | UP TO 70% | NO LIMITATIONS |
| 224.10.10.10 | 70% OR HIGHER | UP TO 50 pps |
| 224.20.20.20 | UP TO 75% | NO LIMITATIONS |
| 224.20.20.20 | 75% OR HIGHER | UP TO 70 pps |
|  |  |  |

| GROUP ADDRESS | IGMP TRANSMISSION BUFFER UTILIZATION RATE | IGMP TRANSMISSION BUFFER SIZE |
|---|---|---|
| 224.10.10.10 | UP TO 70% | 32 Kbytes |
| 224.10.10.10 | 70% OR HIGHER | 64 Kbytes |
| 224.20.20.20 | UP TO 75% | 16 Kbytes |
| 224.20.20.20 | 75% OR HIGHER | 32 Kbytes |
| | | |

MULTICAST PACKET CONTROL APPARATUS

BACKGROUND OF THE INVENTION

1. Field of the Invention

The present invention relates to multicast packet control apparatuses for use in content information distribution such as broadcasting, and more specifically, to a multicast packet control apparatus for transferring a response report, a join request, and a leave statement.

2. Description of the Related Art

Use of broadband has brought multicast technologies for content distribution such as broadcasting into spotlight. Efficient information distribution can be performed by using a router and an access server supporting IP multicasting for implementing a broadcast service on an Internet Protocol (IP) network built for communication. The Internet Engineering Task Force (IETF) has specified Internet Group Membership Protocol (IGMP) protocols (RFC 1112 and RFC 2236) for IPv4 and a Multicast Listener Discovery (MLD) protocol (RFC 2710) for IPv6, as standard TCP/IP technologies related to multicast communication for distributing data to a plurality of specific destinations. The IGMP and MLD protocols are used between user terminals and a packet transfer apparatus, such as a gateway and a router, and control a user terminal group (multicast group) formed to receive data distributed by multicast distribution for distributing the same data to a plurality of user terminals efficiently. The IGMP and MLD protocols are used when a user terminal makes a join request to a multicast group (a request to distribute multicast data) or sends a leave statement to the multicast group (a request to stop distributing multicast data). When a content distribution server distributes information (a content) as packets, as requested by a user terminal included in a multicast group, in a content distribution service achieved by the technologies related to multicast communication for distributing data to a plurality of specific destinations, a lower packet transfer apparatus (such as a gateway and a router) receives the packet information, makes as many copies of the packet as the user terminals belonging to the requesting multicast group, and transfers the copies to the user terminals.

In a conventional network configuration, when a distribution server sends a join confirmation packet to a plurality of user terminals included in a multicast group, the packet is copied by a Layer 2 switch between the multicast router and the user terminals and sent to the user terminals. The user terminals receive the packet and return a response report packet. In order to prevent congestion on the network because of the response report packets from the user terminals, each user terminal starts a random timer when it receives the join confirmation packet and returns the response report packet when the timer reaches zero. When a first user terminal returns a response report packet, the packet is copied by the Layer 2 switch and can be received by another user terminal in the same subnet. The user terminal receiving the copy recognizes that it does not need to return a response report and will return no response report packet. Therefore, the multicast router can judge whether the multicast data transmission is needed or not by a minimum number of response report packets.

User management such as a multicast accounting service and user approval may not be correctly performed on the network described above. Because the multicast data and the response report packet are copied by the Layer 2 switch and broadcast simultaneously to the user terminals in the same subnet, security is lax.

In recent years, in access networks between user terminals and routers, one physical LAN is divided into a plurality of virtual LANs (VLANs) or the Point-to-Point Protocol over Ethernet (PPPoE) is used. Each of the user terminals and the router are linked in a point-to-point manner, enabling the user to be identified or differentiated and a security check to be run on each user.

| [Non-patent document 1] | RFC 1112 |
| [Non-patent document 2] | RFC 2236 |
| [Non-patent document 3] | RFC 2710 |

SUMMARY OF THE INVENTION

When VLANs or PPPoE is used for user management and security management, each of the user terminals and the router are linked in a point-to-point fashion. In multicast communication on that type of network, when a plurality of user terminals receive a join confirmation packet from the multicast router, each user terminal will send a response report packet when a random time elapses. Each user terminal cannot recognize that another user terminal sends a response report, and the multicast router turns out to receive a great number of response report packets simultaneously. In the conventional network, a minimum necessary number of response reports are sent to the multicast router, and the multicast router is protected from excessive load. In the network assumed in the present invention, all the response reports of the user terminals could be sent to the multicast router, and the high load would prevent multicast data from being transferred normally.

IGMPv2 and the like can disperse, to some extent, the great number of response reports responding to the join confirmation, by increasing the maximum response time value and the cycle of join confirmation by the multicast router. Too great a cycle would increase the user information update time by the multicast router and would make it hard to perform correct user management including an accounting service in some cases.

In a network in which the router and each of the user terminals are linked in a point-to-point manner, when all the user terminals become back in use after they went down by a power failure and the like during a multicast service or when a regular broadcast service is performed, a great number of join request packets or leave statement packets could be sent from the user terminals to the multicast router, and the high load on the multicast router would disable normal transfer.

Accordingly, it is an object of the present invention to protect a multicast router from high load even if a great number of packets, such as response report packets, join request packets, and leave statement packets, are sent from the user terminals to the multicast router at the same time in multicast communication where each of the user terminals and the multicast router are linked in a point-to-point fashion by VLANs, PPPoE, or the like. Another object of the present invention is to allow the multicast router to update a user management table correctly.

When a plurality of user terminals return response report packets to the multicast router simultaneously in response to join confirmation from the multicast router, a Layer 2 switch between the user terminals and the multicast router does not transfer the packets directly but limits the number of response report packets returned to the multicast router in a certain period or the transfer rate. When the limitation is imposed, response report packets overflowing a transmission buffer of the Layer 2 switch on the multicast router side are discarded. When the multicast router cannot receive a response report packet from a user terminal in the number of consecutive attempts specified in the multicast router, the multicast router will delete the user information from the user management table. So, intermittent discarding, not consecutive discarding, would pose no problem.

If the number of user terminals increases in the case described above, the Layer 2 switch would discard the response report packets of a user terminal successively, increasing the possibility that the multicast router would delete the information of the user terminal from the user management table. This can be avoided by providing the Layer 2 switch with a table showing a history of discarding response report packets. A response report packet of a user whose response report packet has been discarded can be returned to the multicast router with priority in the next join confirmation event.

If more packets are discarded, the number of times a packet is discarded is recorded for each user in the discard history table, and a response report packet sent from a user having a high number of times a packet has been discarded can be returned to the multicast router with higher priority.

The multicast router imposes a limitation on the interval between when a join confirmation packet is sent and when a response report packet is returned from the user terminal but not on a join request or a leave statement from the user. Accordingly, another means can be used for the join request packet and the leave statement packet. For instance, if a plurality of user terminals send join request packets or leave statement packets to the multicast router simultaneously, the Layer 2 switch between the user terminals and the multicast router does not transfer the packets directly but can limit the number of join request packets or leave statement packets sent to the multicast router in a certain period of time or the transfer rate. If the utilization rate of the transmission buffer of the Layer 2 switch on the multicast router side exceeds a certain threshold, the size of the transmission buffer can be increased so that the Layer 2 switch would not discard the packets.

If the number of user terminals increases further in the case described above, a join request packet sent by a user terminal may be kept in the buffer of the Layer 2 switch, and before the packet is sent to the multicast router, the user terminal could re-send a join request. In this case, a join request packet received by the Layer 2 switch and transferred to the transmission buffer on the multicast router side can be recorded in a table. Then, when the Layer 2 switch receives a re-sent join request packet, the packet can be checked against the table and can be discarded when the packet has been recorded in the table, assuming that the packet has already been sent to the multicast router.

According to the first aspect of the present invention, it is provided that a multicast packet control apparatus for relaying packets between a plurality of user terminals and a packet transfer apparatus in a network system where multicast communication is performed by a point-to-point connection between the user terminals and the packet transfer apparatus, the multicast packet control apparatus comprising:

a multicast transmission buffer for storing packets used in multicast communication;

a transfer limitation table for storing transfer rate limitation information corresponding to the utilization rate of the multicast transmission buffer, and for limiting transfer from the multicast transmission buffer to the packet transfer apparatus;

a discard table for storing a group address and a transmission-source address, and for recording a discarded packet; and a processor for controlling packet transfer by referencing and updating the transfer limitation table and the discard table, wherein the processor transfers a received packet to the multicast transmission buffer when the received packet is determined to be a response packet corresponding to join confirmation from the packet transfer apparatus;

the processor monitors the utilization rate of the multicast transmission buffer, compares the monitored utilization rate with the utilization rate of the multicast transmission buffer specified in the transfer limitation table when the response packet is transferred to the multicast transmission buffer, obtains corresponding transfer rate limitation information, and limits the transfer rate or the number of packets transferred from the multicast transmission buffer to the packet transfer apparatus in accordance with the transfer rate limitation information if a limitation is needed;

the processor searches through the discard table if the response packet is received while the limitation is imposed;

the processor discards the received packet if the discard table contains no data item corresponding to the group address and the transmission-source address of the received packet, and records the group address and the transmission-source address in the discard table; and the processor stores the received packet in the multicast transmission buffer with priority if the discard table contains data items corresponding to the group address and the transmission-source address of the received packet, and deletes the data items corresponding to the group address and the transmission-source address from the discard table.

According to the second aspect of the present invention, it is provided that a multicast packet control apparatus for relaying packets between a plurality of user terminals and a packet transfer apparatus in a network system where multicast communication is performed by a point-to-point connection between the user terminals and the packet transfer apparatus, the multicast packet control apparatus comprising:

a multicast transmission buffer for storing packets used in multicast communication;

a transfer limitation table for storing transfer rate limitation information corresponding to the utilization rate of the multicast transmission buffer, and for limiting transfer from the multicast transmission buffer to the packet transfer apparatus;

a transmission buffer size modification table for storing the size of the multicast transmission buffer corresponding to the utilization rate of the multicast transmission buffer, and for modifying the buffer size in accordance with the utilization rate of the multicast transmission buffer;

a transmission buffer storage table for storing a group address and a transmission-source address to record that a received packet has been stored in the multicast transmission buffer; and a processor for controlling packet transfer by referencing and updating the transfer limitation table, the transmission buffer size modification table, and the transmission buffer storage table, wherein the processor transfers the received packet to the multicast transmission buffer when the packet is determined to be a request packet for multicast communication from the packet transfer apparatus;

the processor monitors the utilization rate of the multicast transmission buffer, compares the monitored utilization rate with the utilization rate of the multicast transmission buffer specified in the transfer limitation table when the request packet is transferred to the multicast transmission buffer, obtains corresponding transfer rate limitation information, and limits the transfer rate or the number of packets transferred from the multicast transmission buffer to the packet transfer apparatus in accordance with the transfer rate limitation information if a limitation is needed;

the processor monitors the utilization rate of the multicast transmission buffer;

the processor obtains the size of the multicast transmission buffer in accordance with the monitored utilization rate of the buffer and the utilization rate of the multicast transmission buffer stored in the transmission buffer size modification table when the request packet is received while the limitation is imposed, and modifies the size of the multicast transmission buffer in accordance with the obtained size; and the processor searches through the transmission buffer storage table, and stores the received packet in the multicast transmission buffer, and the group address and the transmission-source address of the received packet in the transmission buffer storage table if the transmission buffer storage table does not contain the address of the received packet, or the processor discards the received packet if the transmission buffer storage table contains the address of the received packet.

The present invention may also provide a means for limiting response reports transferred to a packet transfer apparatus if it is recognized that response reports are returned simultaneously from a plurality of user terminals in response to join confirmation sent by the packet transfer apparatus.

The present invention may also provide a means for discarding packets overflowing the transmission buffer and a means for recording a discarded packet in a table and sending the discarded packet to the packet transfer apparatus with priority in the next join confirmation event.

The present invention may further provide a means for assigning priority according to the discarded number of packets and preventing packets from being discarded consecutively.

The present invention may also provide a means for limiting join request packets or leave statement packets sent to a packet transfer apparatus if it is recognized that join request packets or leave statement packets are sent simultaneously from a plurality of user terminals and a means for modifying the size of the transmission buffer dynamically while there are many packets.

The present invention may further provide a means for discarding a join request packet re-sent from a user terminal.

According to the present invention, the number of packets that a multicast router must handle in a certain period is reduced even if a great number of packets such as response report packets, join request packets, and leave statement packets are sent from user terminals to the multicast router during a short period of time in VLAN or PPPoE multicast communication, so that the multicast router is protected from high load, and a correct multicast service can be implemented.

According to the present invention, IGMP packets are handled on the basis of the multicast service, that is, on the basis of the group address, so that the multicast router is protected from high load, correct multicast services can be implemented, and the order of priority of the services can also be specified, even if a user terminal joins or is going to join a plurality of multicast services.

According to the present invention, no new protocol is required, and no new function should be added to or set up on the user terminal, so that a plurality of advanced multicast services can be provided, without imposing a load on the user.

BRIEF DESCRIPTION OF THE DRAWINGS

FIG. 5 shows an example user management table.

FIG. 6 shows an example transfer limitation table.

FIG. 7 shows an example discard table.

FIG. 8 shows another example discard table.

FIG. 9 shows an example transmission buffer size modification table.

FIG. 10 shows an example transmission buffer storage table.

FIG. 20 shows the transfer limitation table with a plurality of group addresses specified.

FIG. 21 shows the transmission buffer size modification table with a plurality of group addresses specified.

DESCRIPTION OF THE PREFERRED EMBODIMENTS

Embodiments of the present invention will be described below with reference to the drawings. The embodiments use IPv4 and IGMP in the following description, but the present invention can also be applied to IPv6, MLD, and other methods. The basic operation with IPv6 and MLD is the same, and a description of an embodiment using IPv6 and MLD will be omitted. For ease of description, a Layer 2 switch is taken as an example of a multicast packet control apparatus having the means of the present invention. The present invention, however, can be applied also to a receiving block of a router, a broadband access server (BAS), and other multicast terminating apparatuses, as well as the Layer 2 switch. Moreover, an appropriate packet transfer apparatus which can perform multicast distribution can be used instead of a router described below.

1. System Configuration

Figure 1:
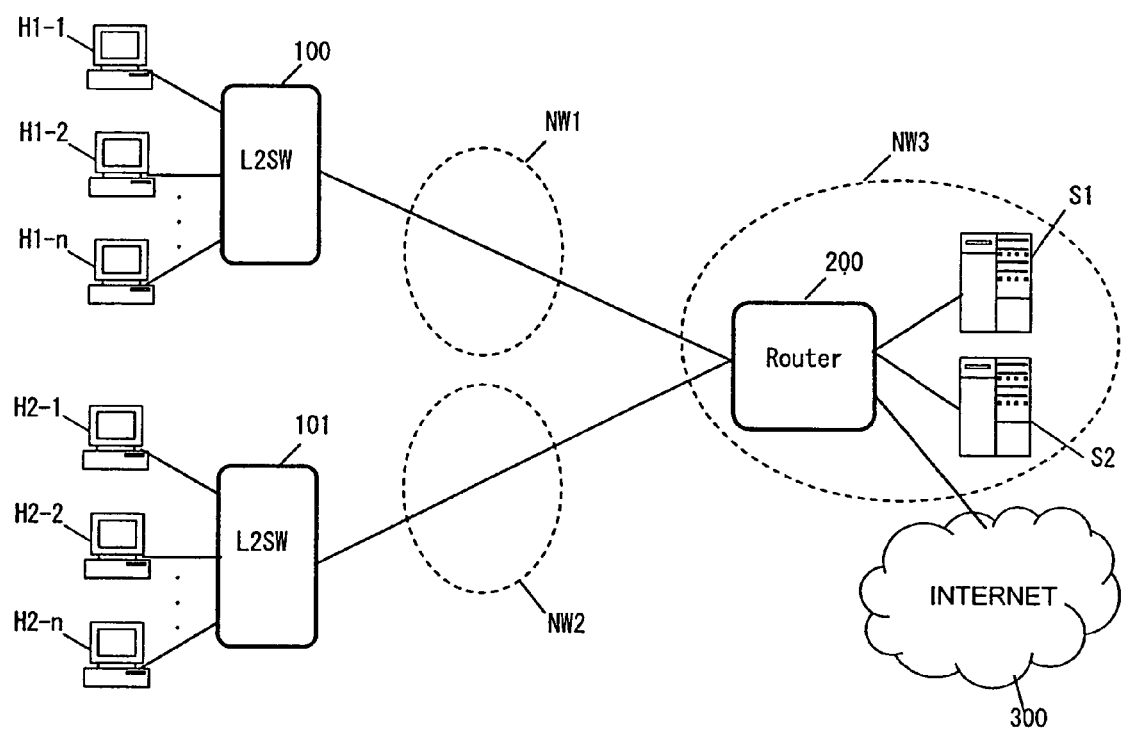
FIG. 1 is a diagram showing an example network configuration in an embodiment.

FIG. 1 shows an example network configuration.

In the shown example network configuration, user terminals H1-1 to H1-n and H2-1 and H2-n are served by Layer 2 switches 100 and 101 and connected through access networks NW1 and NW2 and a router 200 in an ISP network NW3 to the Internet 300, content distribution servers S1 and S2, and the like. The user terminals H1-1 to H1-n and H2-1 to H2-n and the router 200 are connected by VLANs, PPPoE, PPPoA, or the like.

Figure 2:
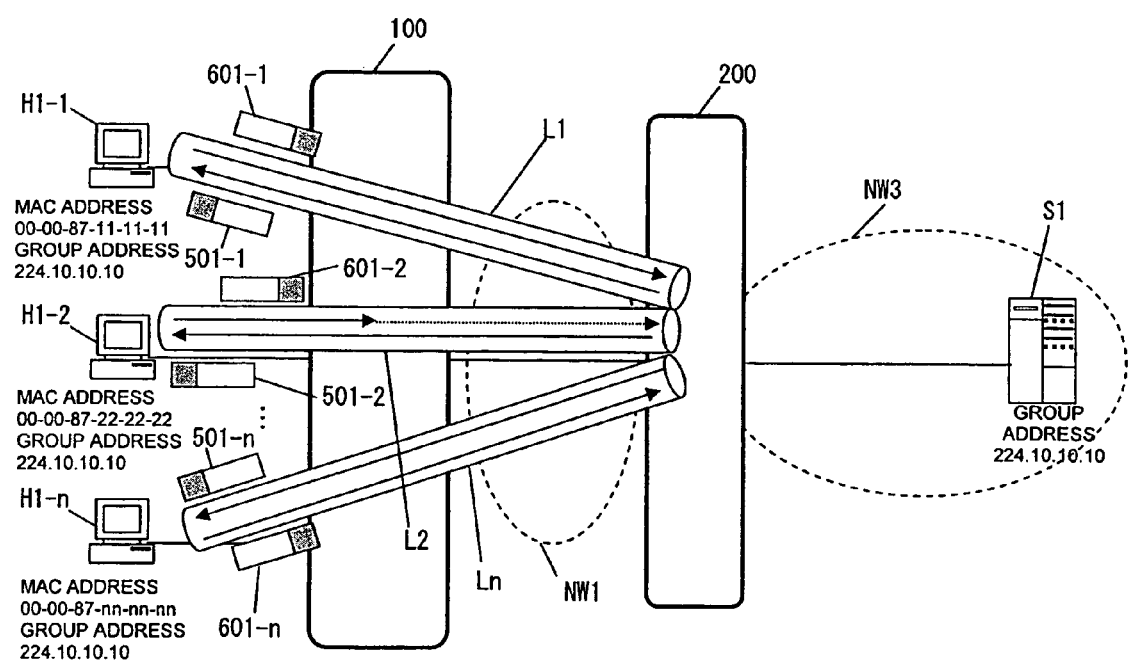
FIG. 2 is a diagram showing the flows of multicast packets in the embodiment.

FIG. 2 is a diagram showing the flow of IGMP packets.

Point-to-point connections L1 to Ln are made by VLANs, PPPoE, PPPoA, or the like between the user terminals H1-1 to H1-n and the router 200. The user terminals H1-1 to H1-n have already been signed up with a content provider and have already been qualified to join a multicast group (of group address 224.10.10.10, for instance). The user terminals H1-1 to H1-n are assigned, for instance, MAC addresses 00-00-87-11-11-11 and 00-00-87-22-22-22 to 00-00-87-nn-nn-nn. The content distribution server S1 periodically checks through the router 200 whether the user terminals H1-1 to H1-n want the distribution of multicast data. The router 200 gathers the information of the user terminals H1-1 to H1-n, on behalf of the content distribution server S1. The router 200 sends join confirmation packets 501-1 to 501-n to the user terminals H1-1 to H1-n. The user terminals H1-1 to H1-n return response report packets 601-1 to 601-n to the router 200 if they want continuous distribution of multicast data. The router 200 knows that the user terminals H1-1 to H1-n want continuous distribution of multicast data by receiving the response report packets 601-1 to 601-n.

Figure 3:
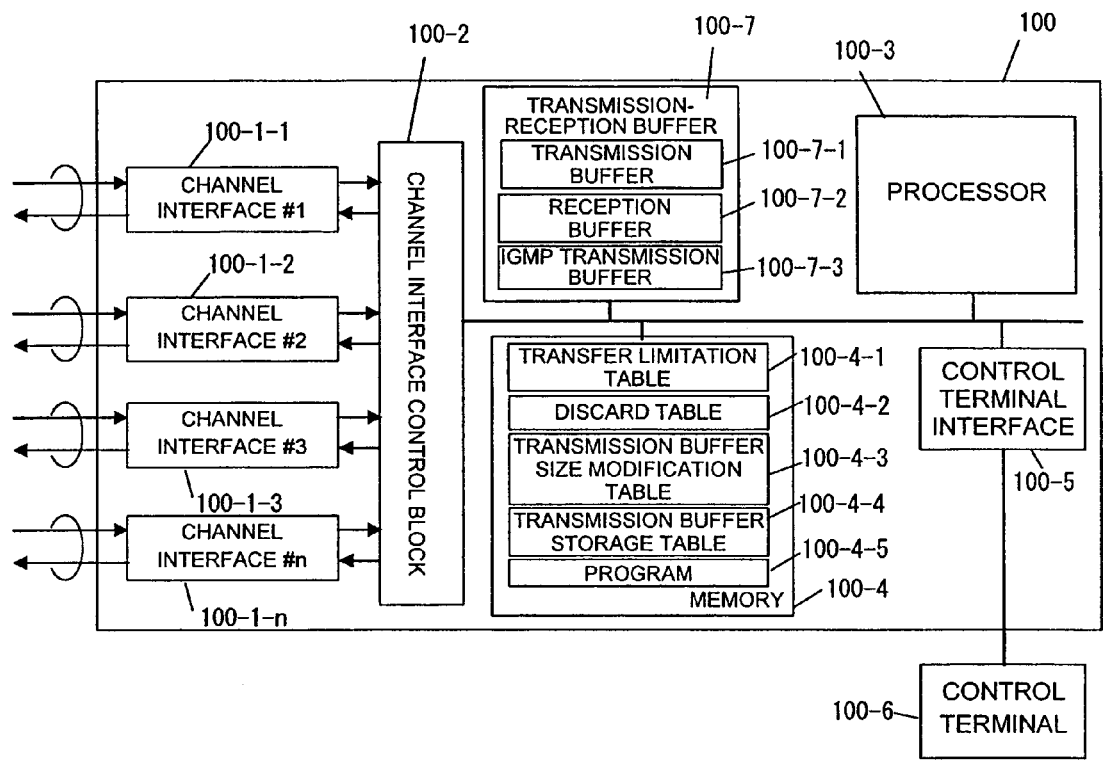
FIG. 3 shows an example internal configuration of a Layer 2 switch of the present invention.

FIG. 3 is a diagram showing the internal configuration of the Layer 2 switch 100 in the present embodiment.

The Layer 2 switch 100 includes a plurality of input-output channel interfaces 100-1-i (i=1 to n), a channel interface control block 100-2 for controlling the channel interfaces 100-1-i, a processor 100-3 for performing packet analysis and other processing, a memory 100-4 provided for use in the processing by the processor 100-3, a control terminal interface 100-5 for interfacing an external control terminal 100-6, and a transmission-reception buffer 100-7 for temporarily storing packets received and to be sent via the channel interfaces 100-1-i. The transmission-reception buffer 100-7 includes a transmission buffer 100-7-1, a reception buffer 100-7-2, and an IGMP transmission buffer 100-7-3. The memory 100-4 stores a program 100-4-5 executed by the processor 100-3, a transfer limitation table 100-4-1 for limiting the transfer of IGMP packets sent from the user terminals H1-1 to H1-n to the router 200, a discard table 100-4-2 for recording a discarded packet, a transmission buffer size modification table 100-4-3 for modifying the size of the IGMP transmission buffer 100-7-3, and a transmission buffer storage table 100-4-4 for recording a packet transferred to the IGMP transmission buffer 100-7-3.

Figure 4:
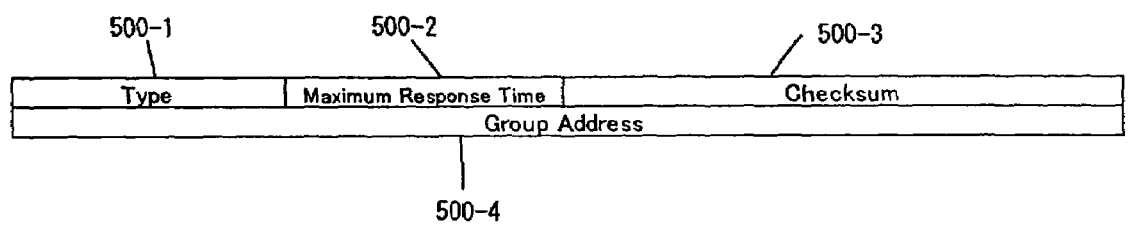
FIG. 4 shows an IGMP message format.

FIG. 4 is a view showing the format of the header 500 of an IGMP message exchanged between the user terminals H1-1 and H1-n and the router 200.

As specified in RFC 1121 and RFC 2236, the header 500 of an IGMP message has a type field 500-1, a maximum response time field 500-2, a checksum field 500-3, and a group address field 500-4. The type field 500-1 indicates the type of the IGMP message, by which it can be recognized whether the IGMP message is a join confirmation packet, a response report packet, or a leave statement packet. The join request packet and the response report packet have the same content in the type field 500-1. The user terminal receives a join confirmation packet, then returns a response report after the lapse of a period indicated by the value specified in the maximum response time field 500-2.

The tables in the memory 100-4 will be described next.

FIG. 5 is a view showing a user management table 200-1 included in the router 200. Each data record has a group address 200-1-1, a user terminal IP address 200-1-2, a port number 200-1-3, and a consecutive no-response count 200-1-4. The router makes join confirmation of the user terminals included in the table at regular intervals and updates the table in accordance with the corresponding response reports or join requests or leave statements from the user terminals. When the router 200 updates the table in accordance with response reports, if a user terminal fives no response consecutively the specified number of times, the user information is deleted from the table, so as to improve general user management accuracy.

FIG. 6 is a view showing details of the transfer limitation table 100-4-1.

Each data record has an IGMP transmission buffer utilization rate 100-4-1-2 and a transfer rate limitation 100-4-1-3. The utilization rate of the IGMP transmission buffer 100-7-3 is compared with the value specified as the IGMP transmission buffer utilization rate 100-4-1-2, and the IGMP packets transferred from the Layer 2 switch 100 to the router 200 are limited accordingly (this will be described later in further detail).

FIGS. 7 and 8 are views showing details of the discard table 100-4-2.

Each data record has a group address 100-4-2-1, a transmission-source MAC address 100-4-2-2, and priority information that includes either or both of a discard count 100-4-2-3 and a priority level 100-4-2-4. The table records the transmission-source MAC address 100-4-2-2 of a discarded packet overflowing the IGMP transmission buffer 100-7-3 and the discard count 100-4-2-3, and transfers a packet sent from the user terminal for which a packet has been discarded, to the IGMP transmission buffer 100-7-3 with priority in the next join confirmation from the router 200. FIG. 8 shows that an increment in the discard count 100-4-2-3 increases the priority level 100-4-2-4, allowing a packet of the corresponding group address and the corresponding transmission-source address to be transferred to the IGMP transmission buffer 100-7-3 with priority (this will be described later in further detail). If priority-based control is not performed, the priority information can be omitted.

FIG. 9 is a view showing details of the transmission buffer size modification table 100-4-3.

Each data record has an IGMP transmission buffer utilization rate 100-4-3-2 and an IGMP transmission buffer size 100-4-3-3. If the utilization rate of the IGMP transmission buffer 100-7-3 exceeds the value specified as the IGMP transmission buffer utilization rate 100-4-3-2, the IGMP transmission buffer 100-7-3 is enlarged to prevent packets from being discarded (this will be described later in further detail).

FIG. 10 is a view showing details of the transmission buffer storage table 100-4-4.

Each data record has a group address 100-4-4-1 and a transmission-source MAC address 100-4-4-2. The table records these addresses of a packet transferred from the reception buffer to the IGMP transmission buffer 100-7-3 (this will be described later in further detail).

2. Overview of Operation

Figure 15:
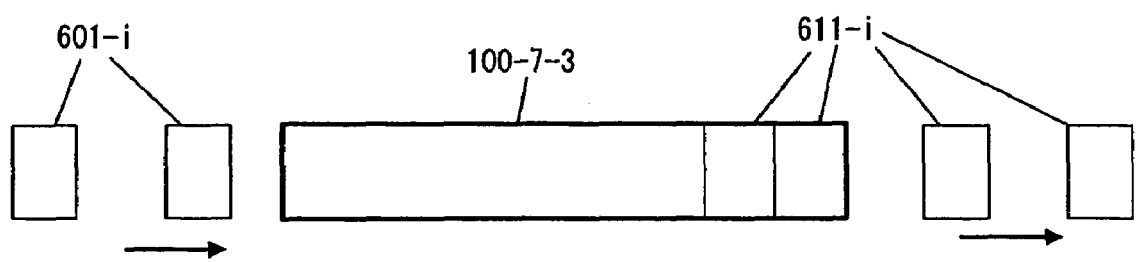
FIG. 15 is a diagram showing an IGMP transmission buffer in a normal state.

FIG. 15 is a diagram showing the IGMP transmission buffer 100-7-3 in a normal state. The figure shows that an IGMP packet is transferred from the reception buffer 100-7-2 to the IGMP transmission buffer 100-7-3 and sent to the router 200.

Figure 16:
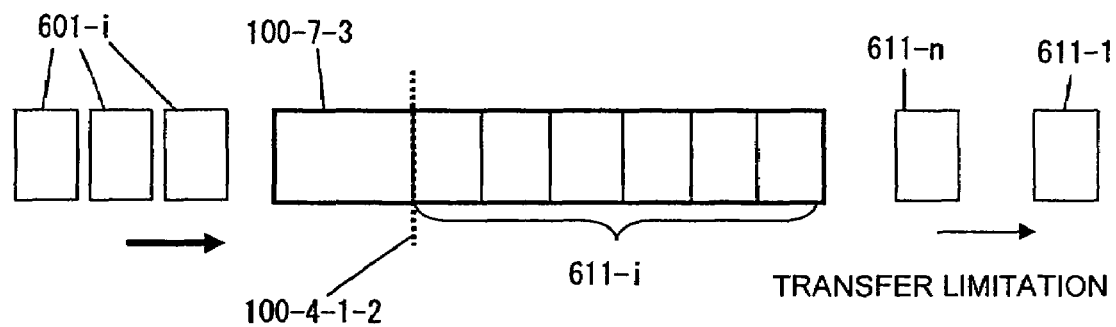
FIG. 16 is a diagram showing the IGMP transmission buffer with an increased utilization rate.

FIG. 16 is a diagram showing the IGMP transmission buffer with an increased utilization rate. The figure shows that when there are more IGMP packets than those shown in FIG. 15 and when the utilization rate of the IGMP transmission buffer 100-7-3 reaches the threshold 100-4-3-2 specified in the transmission buffer size modification table 100-4-3, IGMP packets transferred to the router 200 are limited.

Figure 17:
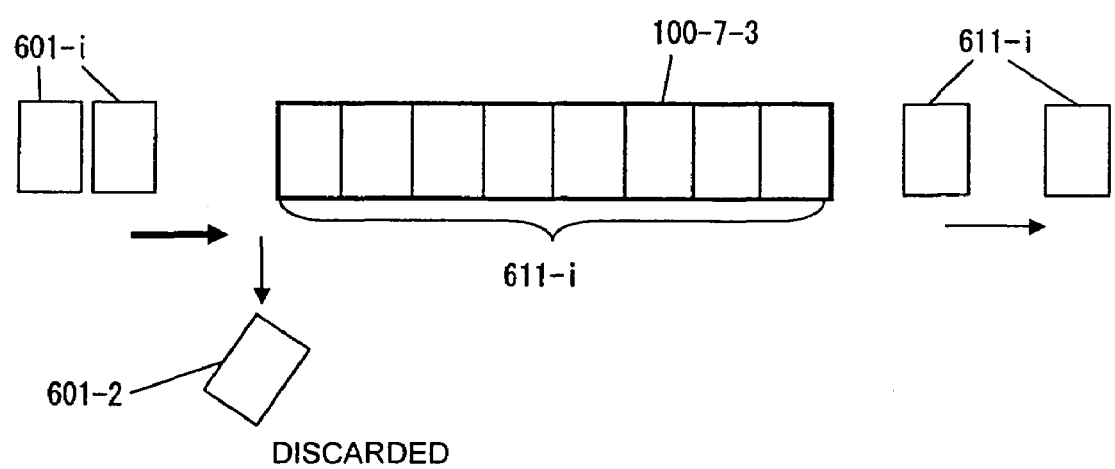
FIG. 17 is a diagram showing how a packet is discarded when the utilization rate of the IGMP transmission buffer is high.

FIG. 17 is a diagram showing that a packet is discarded because of a high utilization rate of the IGMP transmission buffer. The figure shows that while the limitation shown in FIG. 16 is continuously imposed, an IGMP packet transferred from the reception buffer 100-7-2 overflows the IGMP transmission buffer 100-7-3 and is discarded.

Figure 18:
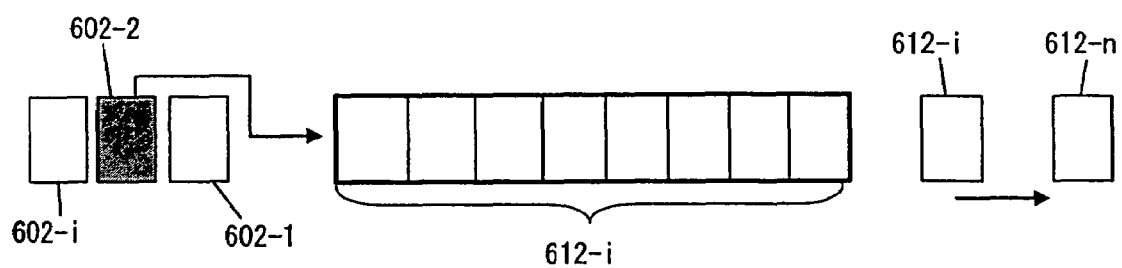
FIG. 18 is a diagram showing how a packet is transferred to the IGMP transmission buffer with priority.

FIG. 18 is a diagram showing that a packet is transferred to the IGMP transmission buffer 100-7-3 with priority. The figure shows that if the reception buffer 100-7-2 has a priority packet while the limitation is imposed in the same manner as shown in FIG. 17, the priority packet is transferred to the IGMP transmission buffer 100-7-3.

3. Operation Sequence

Figure 11:
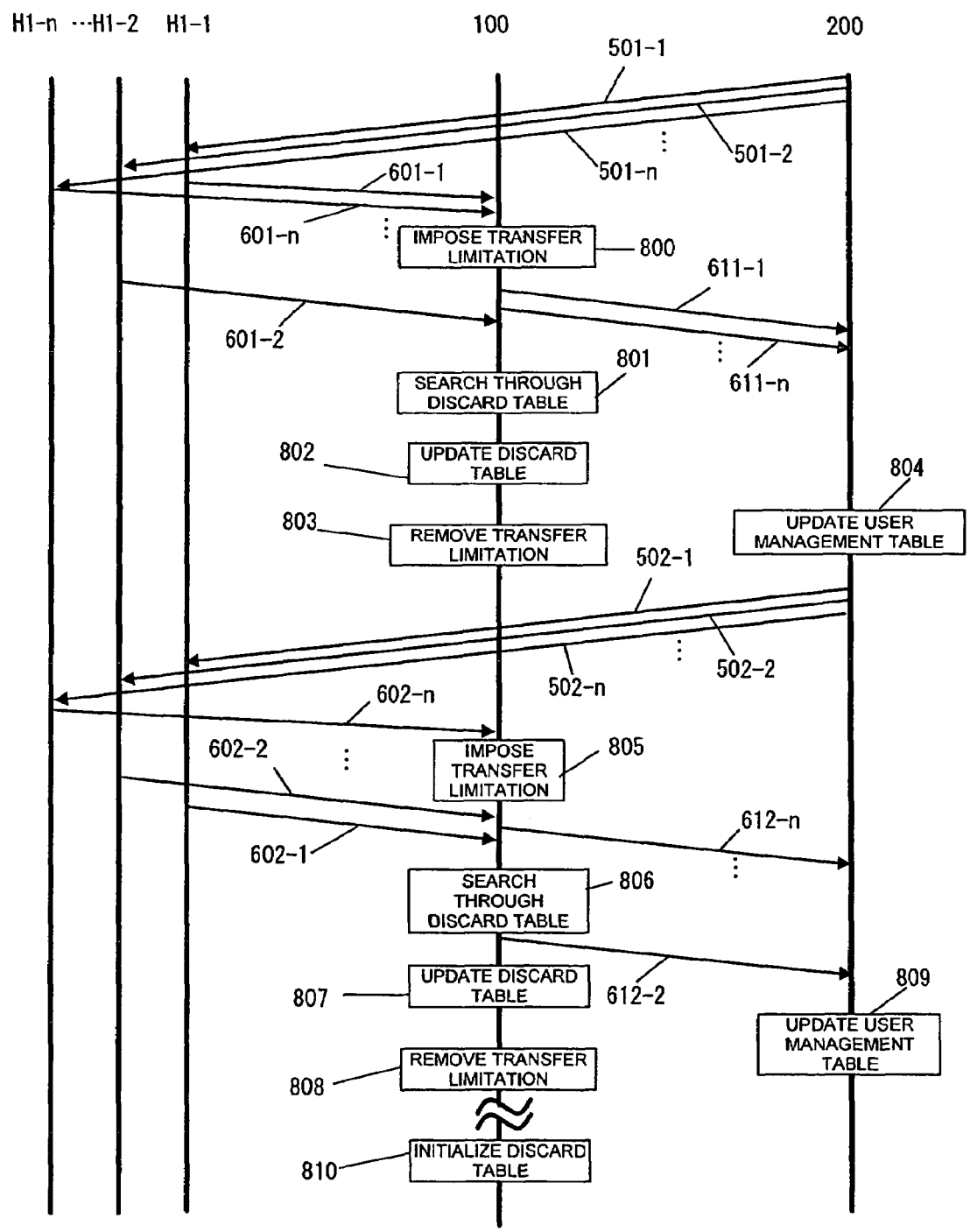
FIG. 11 shows a sample sequence used when many response reports are sent.

FIG. 11 is a sequence diagram showing that the router 200 makes join confirmation and the user terminals H1-1 to H1-n return response reports simultaneously.

Figure 12:
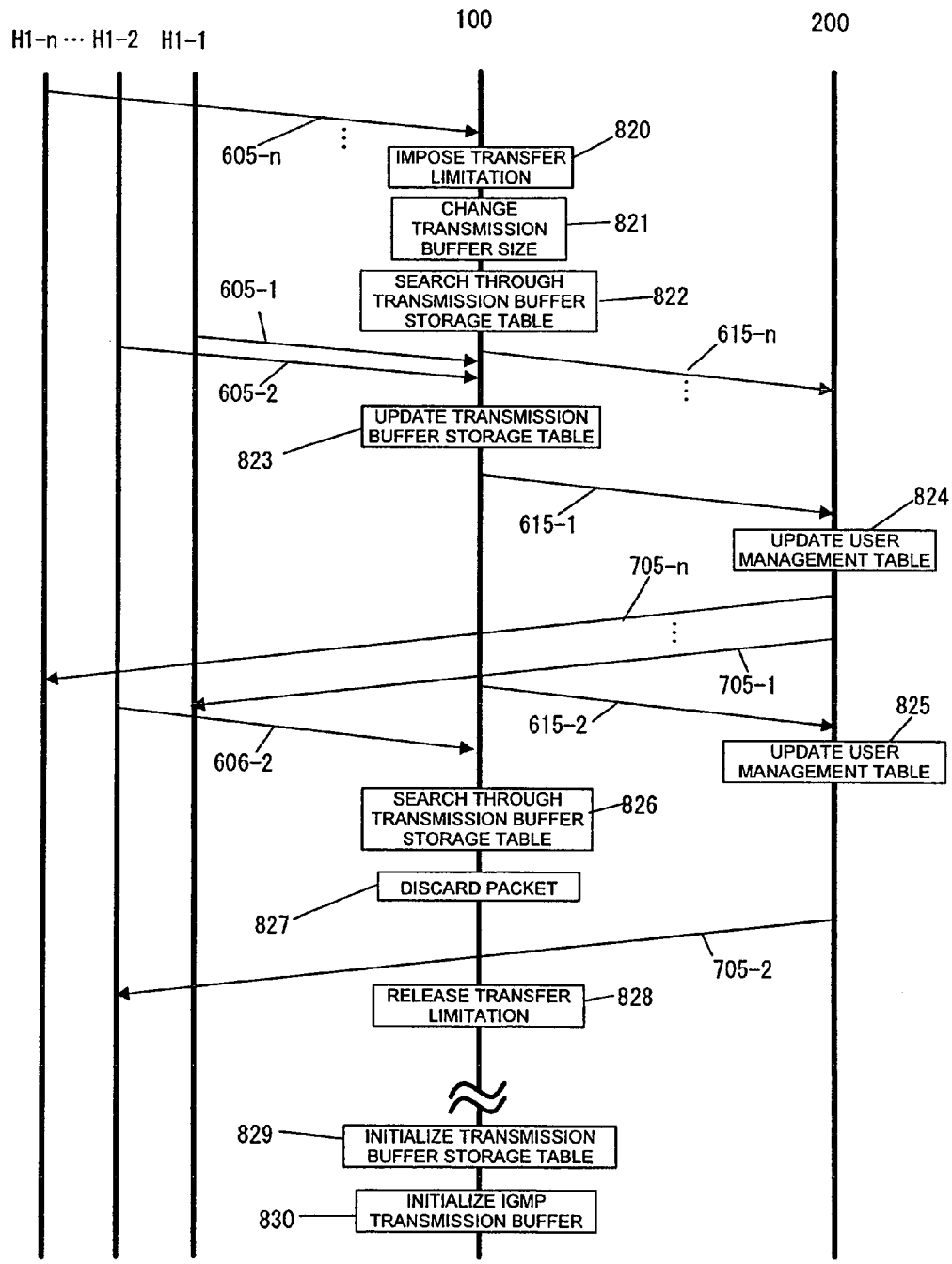
FIG. 12 shows a sample sequence used when many join requests or leave statements are sent.

FIG. 12 is a sequence diagram showing that the user terminals H1-1 to H1-n send join requests or leave statements simultaneously.

Figure 13:
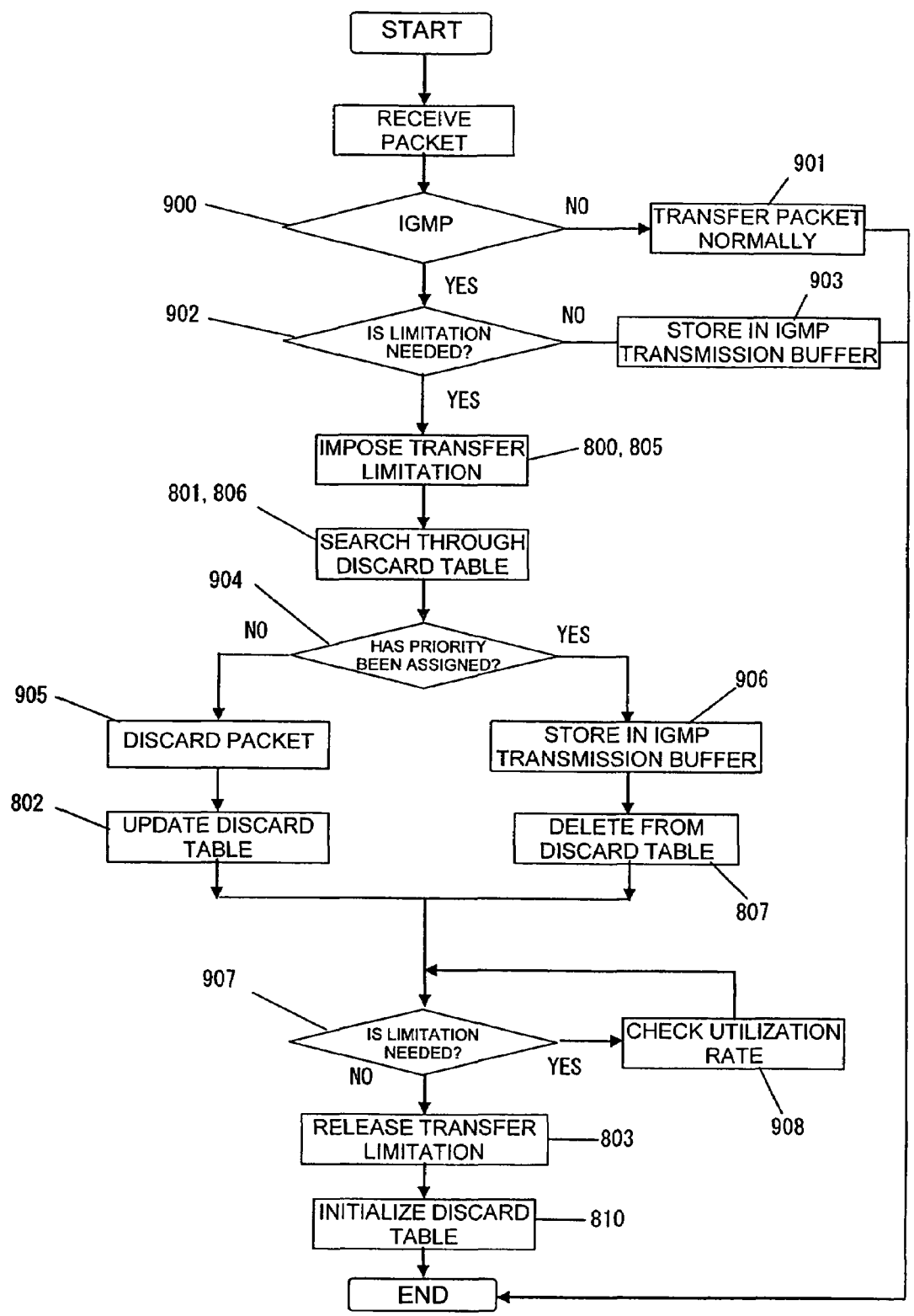
FIG. 13 shows a flow chart of processing performed when the Layer 2 switch receives response reports.

FIG. 13 is a flow chart of processing performed when the Layer 2 switch 100 receives a response report from the user terminals H1-1 to H1-n.

Figure 14:
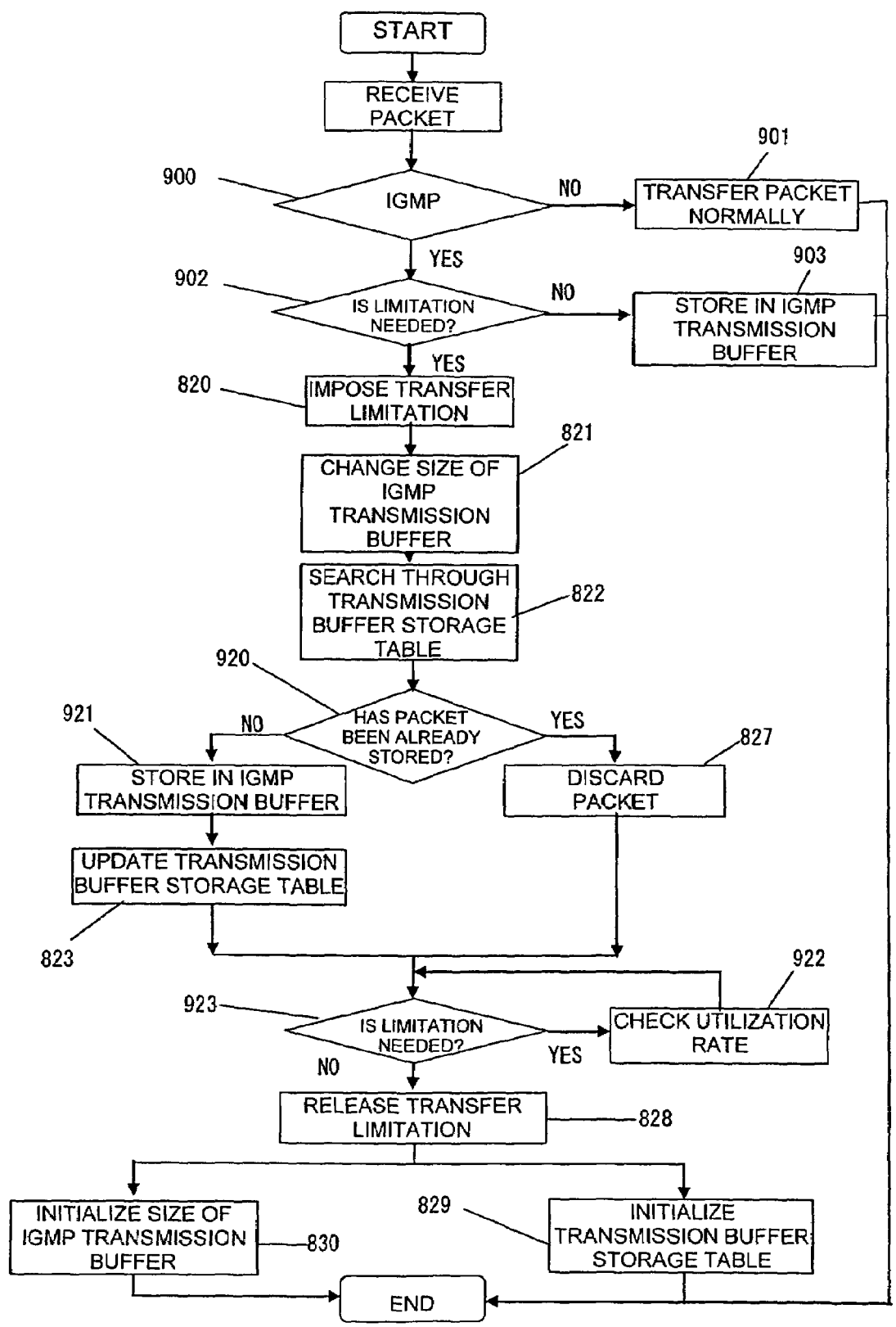
FIG. 14 shows a flow chart of processing performed when the Layer 2 switch receives join requests or leave statements.

FIG. 14 is a flow chart of processing performed when the Layer 2 switch 100 receives a join request packet or a leave statement packet from the user terminals H1-1 to H1-n.

3-1. First Embodiment (when Response Reports are Sent Simultaneously)

When the user terminals H1-1 to H1-n return response report packets simultaneously in response to join confirmation made by the router 200, the Layer 2 switch 100 operates as described below.

The router 200 broadcasts join confirmation packets 500-1 to 501-n to the user terminals H1-1 to H1-n, then the user terminals H1-1 to H1-n return response report packets 601-1 to 601-n simultaneously. The response report packets reach the channel interfaces 100-1 of the Layer 2 switch 100 and are transferred to the channel interface control block 100-2. The channel interface control block 100-2 transfers the received packets to the reception buffer 100-7-2 and makes an interrupt to notify the processor 100-3 that the packets have been received. Receiving the interrupt, the processor 100-3 reads the packets from the reception buffer 100-7-2 and handles the packets in accordance with the flow chart shown in FIG. 13.

The processor 100-3 of the Layer 2 switch 100 checks whether a received packet is an IGMP packet (in step 900). If not, the processor 100-3 transfers the packet to the transmission buffer 100-7-1 as usual (in step 901). If the packet is an IGMP packet, it should be noted that the simultaneous transfer of IGMP packets to the transmission buffer 100-7-1 without a limitation would cause a great number of IGMP packets to apply a load on the router 200. To avoid this problem, the processor 100-3 transfers the IGMP packet to the IGMP transmission buffer 100-7-3. The processor 100-3 also monitors the utilization rate of the IGMP transmission buffer 100-7-3. When the IGMP packet is transferred to the IGMP transmission buffer 100-7-3, the processor 100-3 compares the monitored utilization rate with the IGMP transmission buffer utilization rate 100-4-1-2 specified in the transfer limitation table 100-4-1, and determines whether the number of IGMP packets to be transferred from the IGMP transmission buffer 100-7-3 to the router 200 or the transfer rate should be limited (in step 902). The processor 100-3 checks the IGMP transmission buffer utilization rate 100-4-1-2, compares it with the monitored utilization rate, and obtains an appropriate transfer rate limitation 100-4-1-3. If a limitation is required, the processor 100-3 limits the transfer rate from the IGMP transmission buffer 100-7-3 to the router 200. If no limitation is required, the packet is directly transferred from the IGMP transmission buffer 100-7-3 to the router 200 (in step 903).

When the limitation is imposed (in step 800), if a received IGMP packet 601-2 overflows the IGMP transmission buffer 100-7-3, the processor 100-3 checks the discard table 100-4-2 (in step 801) to see whether the packet should be transferred with priority (in step 904). Specifically, the processor 100-3 checks either or both of the discard count 100-4-2-3 and the priority level 100-4-2-4 in accordance with the group address and the transmission-source MAC address of the received packet. If no corresponding data record is found in the discard table 100-4-2, the packet is discarded (in step 905), and the fact of discarding is recorded in the discard table 100-4-2 (in step 802). That is, the group address 100-4-2-1, the transmission-source MAC address 100-4-2-2, the discard count 100-4-2-3, and the priority level 100-4-2-4 of the packet are recorded. With reference to the transfer limitation table 100-4-1, the processor 100-3 removes the transfer limitation (in step 803) if the utilization rate 100-4-1-2 of the IGMP transmission buffer 100-7-3 falls below the specified value (in step 907). If the processor 100-3 judges that a limitation is required in step 907, the processor 100-3 checks the utilization rate (in step 908).

After the response reports transferred from the user terminals H1-1 to H1-n are partially discarded by the Layer 2 switch 100 and sent to the router 200 as response packets 611-1 to 611-n, the router 200 updates the user management table 200-1 in accordance with the transferred response reports. That is, the group address 200-1-1, the user terminal IP address 200-1-2, the port number 200-1-3, and the consecutive no-response count 200-1-4 are updated. The router 200 does not delete the discarded user information from the user management table 200-1 at one join confirmation event (in step 804).

When the router 200 sends second or subsequent join confirmation packets 502-1 to 502-n to the user terminals H1-1 to H1-n, the user terminals H1-1 to H1-n return response report packets 602-1 and 602-n as in the first join confirmation event. The Layer 2 switch 100 receives the response report packets and processes them in accordance with the flow chart shown in FIG. 13, as in the first join confirmation event. If a transfer limitation has been imposed (in step 805), the processor 100-3 searches through the discard table 100-4-2 for the group address and the transmission-source MAC address of each packet (in step 806). If an IGMP packet discarded in the first join confirmation event is found, the packet is transferred from the reception buffer 100-7-2 to the IGMP transmission buffer 100-7-3 with priority (in step 906). Then, the corresponding packet information is deleted from the discard table 100-4-2 (in step 807).

The same IGMP packet 612-2 as that discarded in the first join confirmation event is now transferred to the router 200 with priority. The router 200 can update the user management table 200-1 without deleting the user information of a packet discarded in the first join confirmation event from the user management table 200-1 (in step 809).

If more user terminals return response reports, packets sent from the same user terminal may be discarded successively in the first and second join confirmation events. This can be avoided by assigning a priority level to the user terminal for which the packets have been discarded, in accordance with the number of times they are discarded, as shown in the discard table 100-4-2 in FIG. 8. The processor 100-3 increments the discard count 100-4-2-3 in accordance with the group address and the transmission-source MAC address of the received packet and records the priority level 100-4-2-4 accordingly. The processor 100-3 searches the discard table 100-4-2 for the group address and the transmission-source MAC address of the received packet, and judges the priority level of transfer in accordance with the priority level 100-4-2-4 or the discard count 100-4-2-3. Either the discard count 100-4-2-3 or the priority level 100-4-2-4 can be omitted. If the priority level is not assigned, the data fields of the discard count 100-4-2-3 and the priority level 100-4-2-4 can be omitted. Accordingly, the same packet as those sent from the same user terminal and discarded twice in row is transferred to the router 200 with the highest priority in the third join confirmation event, so that the router 200 will not delete the user information from the user management table 200-1 by mistake.

The processor 100-3 also initializes the discard table 100-4-2 after the lapse of a certain period of time since the transfer limitation is released (in step 810).

Accordingly, the router 200 can be protected from high load, without changing the cycle or frequency of join confirmation greatly, so that the router 200 can update the user management table 200-1 normally and can transfer multicast data normally, even if the user terminals H1-1 to H1-n return response reports simultaneously. An IP address and another transmission-source address can be used instead of the transmission-source MAC address.

3-2. Second Embodiment (when Join Requests or Leave Statements are Sent Simultaneously)

Described below will be a case in which the user terminals H1-1 to H1-n send join requests or leave statements simultaneously, independently of join confirmation sent from the router 200.

The join requests packets 605-1 to 605-n sent simultaneously from the user terminals H1-1 to H1-n are processed in accordance with the flow chart shown in FIG. 14 (in steps 900 to 903). The processor 100-3 checks the transfer limitation table 100-4-1, compares the monitored utilization rate with the value specified in the table, and determines whether a limitation is needed (in step 902) as in the first embodiment. If there are too many packets, packet transfer from the IGMP transmission buffer 100-7-3 to the router 200 is limited (in step 820). The processor 100-3 enlarges the IGMP transmission buffer 100-7-3 in accordance with the transmission buffer size modification table 100-4-3 (in step 821), so that an IGMP packet overflowing the IGMP transmission buffer 100-7-3 will not be discarded. The processor 100-3 compares the monitored utilization rate and the IGMP transmission buffer utilization rate 100-4-3-2 in the table, and determines the IGMP transmission buffer size 100-4-3-3 accordingly.

The processor 100-3 checks the transmission buffer storage table 100-4-4 (in step 822) to see whether the packet has already been transferred from the reception buffer 100-7-2 to the IGMP transmission buffer 100-7-3 (in step 920). If the corresponding group address and transmission-source MAC address of the received packet are stored in the transmission buffer storage table 100-4-4, the processor 100-3 judges that the packet has already been transferred. Otherwise, it is judged that the packet has not yet been transferred. If the received packet has not yet been transferred, the packet is transferred to the IGMP transmission buffer 100-7-3 (in step 921), and the processor 100-3 updates the transmission buffer storage table 100-4-4 by recording the packet information including the group address and the transmission-source MAC address (in steps 823).

Although a transfer rate limitation is imposed on the IGMP packets transferred to the IGMP transmission buffer 100-7-3 (in step 820), the packets 615-1 to 615-n are reliably transferred to the router 200. The router 200 receives the packets, updates the user management table 200-1 accordingly, accepts their membership (in step 824), and starts distributing multicast data 705-1 to 705-n in accordance with the user management table 200-1.

Because of the distributed user registration processing in the router 200, if the number of users increases, there is a possibility that the user terminal H1-2 re-sends a join request before multicast data distribution starts in response to a first join request, for instance. In this case, the first join request packet 611-2 of the user terminal H1-2 is transferred to the router 200 although there is a delay and the join request is accepted (in step 825). Therefore, when the Layer 2 switch 100 receives the re-sent join request packet 606-2, the processor 100-3 searches through the transmission buffer storage table 100-4-4 (in step 822) in accordance with the flow chart shown in FIG. 14. Because the table contains the corresponding packet information, it is judged that the packet has already been stored in the IGMP transmission buffer 100-7-3 (in step 920), and the re-sent packet is discarded (in step 827). When the join request is accepted, distributing multicast data 705-2 to the user terminal H1-2 starts.

The processor 100-3 monitors the utilization rate of the IGMP transmission buffer 100-7-3 (in step 922) and releases the transfer limitation (in step 828) if the monitored utilization rate falls below the specified IGMP transmission buffer utilization rate 100-4-1-2 (in step 923). After the lapse of a certain period of time since the transfer limitation is released, the processor 100-3 initializes the transmission buffer storage table 100-4-4 and the IGMP transmission buffer size 100-4-3-3 (in steps 829 and 830).

The operation for a join request has been described above. A leave statement is processed in the same manner by the Layer 2 switch 100.

3-3. Third Embodiment (when a Limitation is Imposed on the Group Address Basis)

Figure 19:
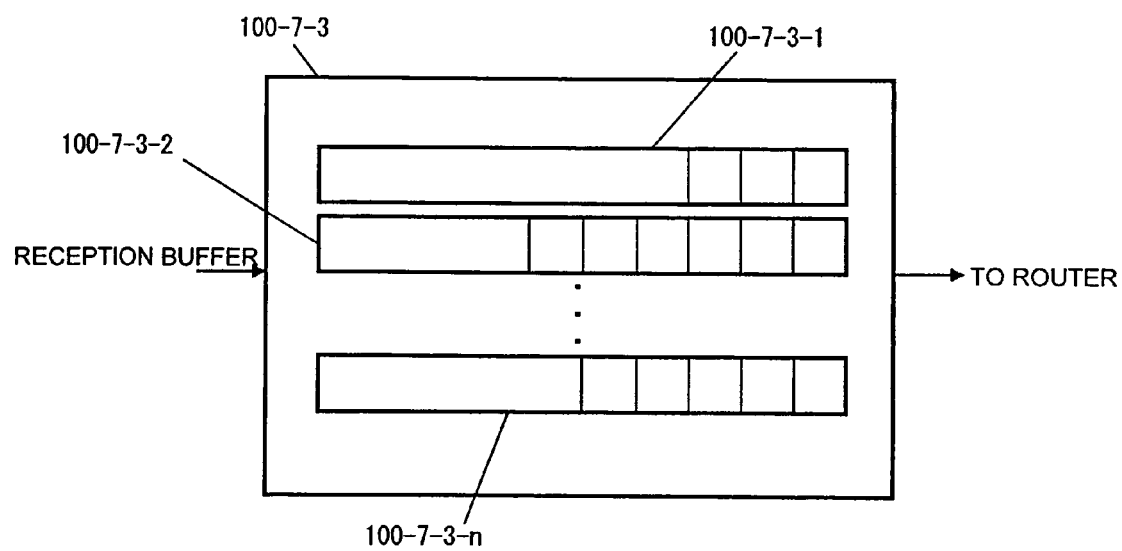
FIG. 19 is a diagram showing the IGMP transmission buffer divided by group address.

FIG. 19 shows that the IGMP transmission buffer 100-7-3 is divided into sections 100-7-3-1 to 100-7-3-n by group address.

FIG. 20 shows details of the transfer limitation table 100-4-1 with a plurality of group addresses 100-4-1-1 specified. Different values of the IGMP transmission buffer utilization rate 100-4-1-2 and the transfer rate limitation 100-4-1-3 can be specified for the individual group addresses 100-4-1-1.

FIG. 21 shows details of the transmission buffer size modification table 100-4-3 with a plurality of group addresses 100-4-3-1 specified. Different values of the IGMP transmission buffer utilization rate 100-4-3-2 and the IGMP transmission buffer size 100-4-3-3 can be specified for the individual group addresses 100-4-3-1.

A case in which transfer limitation processing is performed on the basis of group address in the first embodiment will be described below.

The IGMP transmission buffer 100-7-3 of the Layer 2 switch 100 is divided into sections by group address, as shown in FIG. 19. When the processor 100-3 transfers an IGMP packet received by the Layer 2 switch 100 to the IGMP transmission buffer 100-7-3, the group address field 500-4 of the packet is checked, and the packet is sent to the corresponding group address section, one of the sections 100-7-3-1 to 100-7-3-n of the IGMP transmission buffer. The transfer limitation table 100-4-1 is specified for group addresses as shown in FIG. 20. When the processor 100-3 imposes a transfer limitation, the utilization rate 100-4-1-2 for the group address 100-4-1-1 in the transfer limitation table 100-4-1 is obtained in accordance with the group address of the received packet. The utilization rate and the monitored utilization rate are compared to obtain an appropriate transfer rate limitation 100-4-1-3. The processor 100-3 imposes a transfer limitation on each of the group address sections 100-7-3-1 to 100-7-3-n of the IGMP transmission buffer in accordance with the transfer rate limitation. The other part of the processing and the sequence is the same as in the first embodiment described earlier.

A case in which the size of the IGMP transmission buffer 100-7-3 is modified on the basis of the group address in the second embodiment will be described next. The IGMP transmission buffer 100-7-3 of the Layer 2 switch 100 is divided by group address as shown in FIG. 19, and the processor 100-3 transfers packets to the corresponding group address sections 100-7-3-1 to 100-7-3-n of the IGMP transmission buffer. At that time, the transmission buffer size for each group address is specified in the transmission buffer size modification table 100-4-3, as shown in FIG. 21. The processor 100-3 obtains the utilization rate 100-4-3-2 corresponding to the group address 100-4-3-1 in the transmission buffer size modification table 100-4-3 in accordance with the group address of the received packet, and compares the utilization rate with the monitored utilization rate to obtain an appropriate IGMP transmission buffer size 100-4-3-3 accordingly. The processor 100-3 modifies the size of the corresponding group address sections, one of the sections 100-7-3-1 to 100-7-3-n of the IGMP transmission buffer, in accordance with the obtained buffer size. The other part of the processing and the sequence is the same as in the second embodiment described earlier.

Accordingly, a limitation can be imposed on each service (or on each group address) even if there are a plurality of multicast services, that is, even if the IGMP packets simultaneously sent from the user terminals H1-1 to H1-n have different group addresses, so that the load on the router 200 can be reduced, and the order of priority of the services can be specified.

Figure 22:
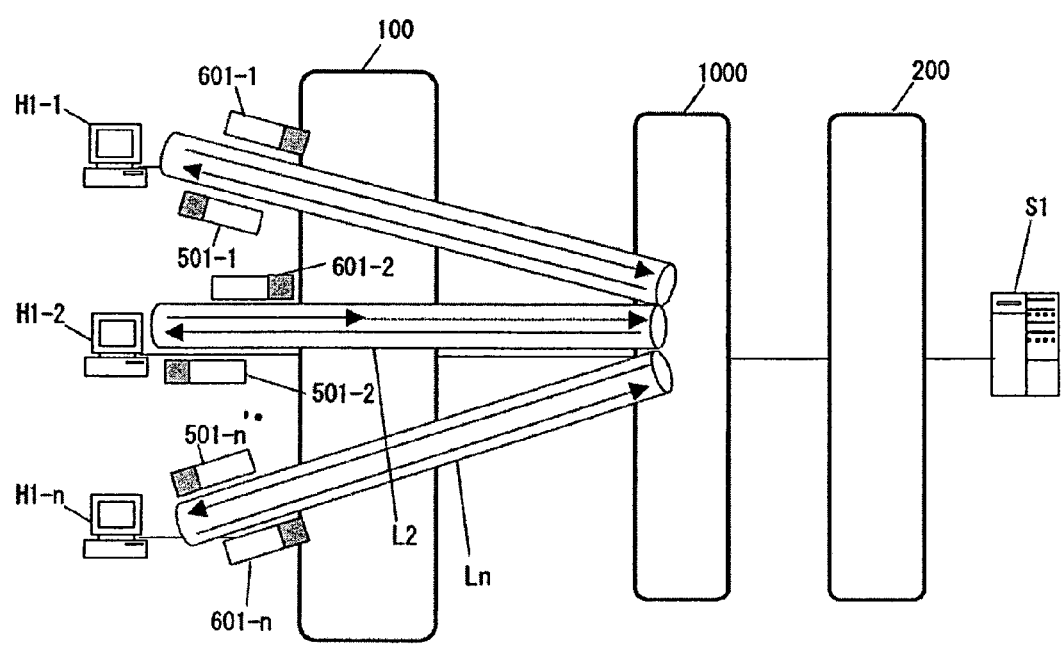
FIG. 22 is a diagram showing a network configuration using a broadband access server (BAS) of the embodiment.

The present invention can be applied to IPv6, MLD, and other methods. Although applications to the Layer 2 switch 100 are described above, the present invention can be applied also to a receiving block of multicast terminating apparatuses such as the router 200 shown in FIG. 2 and a broadband access server (BAS) terminating PPPoE. Furthermore, as shown in FIG. 22, the present invention allows a BAS 1000 supporting IGMP/MLD proxy to be disposed between the router 200 and the user terminals H1-1 to H1-n and H2-1 to H2-n, the BAS to terminate PPPoE sessions with the user terminals H1-1 to H1-n and H2-1 to H2-n, and proxy processing to be performed for the router 200. The present invention also allows a packet transfer apparatus that can perform multicast distribution, other than the router, to be used.

What is claimed is:

1. A multicast packet control apparatus for relaying packets between a plurality of user terminals and a packet transfer apparatus in a network system where multicast communication is performed by a point-to-point connection between the user terminals and the packet transfer apparatus, the multicast packet control apparatus comprising:

a multicast transmission buffer for storing packets used in multicast communication;

a transfer limitation table for storing transfer rate limitation information corresponding to the utilization rate of the multicast transmission buffer, and for limiting transfer from the multicast transmission buffer to the packet transfer apparatus;

a discard table for storing a group address and a transmission-source address, and for recording a discarded packet; and a processor for controlling packet transfer by referencing and updating the transfer limitation table and the discard table, wherein the processor transfers a received packet to the multicast transmission buffer when the received packet is determined to be a response packet corresponding to join confirmation from the packet transfer apparatus;

the processor monitors the utilization rate of the multicast transmission buffer, compares the monitored utilization rate with the utilization rate of the multicast transmission buffer specified in the transfer limitation table when the response packet is transferred to the multicast transmission buffer, obtains corresponding transfer rate limitation information, and limits the transfer rate or the number of packets transferred from the multicast transmission buffer to the packet transfer apparatus in accordance with the transfer rate limitation information if a limitation is needed;

the processor searches through the discard table if the response packet is received while the limitation is imposed;

the processor discards the received packet if the discard table contains no data item corresponding to the group address and the transmission-source address of the received packet, and records the group address and the transmission-source address in the discard table; and the processor stores the received packet in the multicast transmission buffer with priority if the discard table contains data items corresponding to the group address and the transmission-source address of the received packet, and deletes the data items corresponding to the group address and the transmission-source address from the discard table.

2. A multicast packet control apparatus according to claim 1, wherein the multicast transmission buffer comprises a plurality of group address buffers corresponding to group addresses;

the transfer limitation table further stores the group addresses in relation to the utilization rate of the multicast transmission buffer and the transfer rate limitation information; and the processor monitors the utilization rate of each of the group address buffers, compares the monitored utilization rate with the utilization rate of the multicast transmission buffer specified in the transfer limitation table, in accordance with the group address of the received packet when the response packet is transferred to the group address buffer, obtains corresponding transfer rate limitation information, and limits the transfer rate or the number of packets transferred from the group address buffer to the packet transfer apparatus in accordance with the transfer rate limitation information if a limitation is needed.

3. A multicast packet control apparatus according to claim 1, wherein the processor releases the limitation imposed on transfer from the multicast transmission buffer to the packet transfer apparatus if the monitored utilization rate of the multicast transmission buffer falls below the specified value.

4. A multicast packet control apparatus according to claim 1, wherein the discard table further stores the priority information of a discarded packet in relation to the group address and the transmission-source address; and the processor also obtains priority information in accordance with the group address and the transmission-source address of the received packet when it searches through the discard table, and transfers the packet with the highest priority first from the multicast transmission buffer to the packet transfer apparatus.

5. A multicast packet control apparatus according to claim 4, wherein the priority information is the number of times the packet is discarded or a level of priority depending on the number of times the packet is discarded.

6. A multicast packet control apparatus for relaying packets between a plurality of user terminals and a packet transfer apparatus in a network system where multicast communication is performed by a point-to-point connection between the user terminals and the packet transfer apparatus, the multicast packet control apparatus comprising:

a multicast transmission buffer for storing packets used in multicast communication;

a transfer limitation table for storing transfer rate limitation information corresponding to the utilization rate of the multicast transmission buffer, and for limiting transfer from the multicast transmission buffer to the packet transfer apparatus;

a transmission buffer size modification table for storing the size of the multicast transmission buffer corresponding to the utilization rate of the multicast transmission buffer, and for modifying the buffer size in accordance with the utilization rate of the multicast transmission buffer;

a transmission buffer storage table for storing a group address and a transmission-source address to record that a received packet has been stored in the multicast transmission buffer; and a processor for controlling packet transfer by referencing and updating the transfer limitation table, the transmission buffer size modification table, and the transmission buffer storage table, wherein the processor transfers the received packet to the multicast transmission buffer when the packet is determined to be a request packet for multicast communication from the packet transfer apparatus;

the processor monitors the utilization rate of the multicast transmission buffer, compares the monitored utilization rate with the utilization rate of the multicast transmission buffer specified in the transfer limitation table when the request packet is transferred to the multicast transmission buffer, obtains corresponding transfer rate limitation information, and limits the transfer rate or the number of packets transferred from the multicast transmission buffer to the packet transfer apparatus in accordance with the transfer rate limitation information if a limitation is needed;

the processor monitors the utilization rate of the multicast transmission buffer;

the processor obtains the size of the multicast transmission buffer in accordance with the monitored utilization rate of the buffer and the utilization rate of the multicast transmission buffer stored in the transmission buffer size modification table when the request packet is received while the limitation is imposed, and modifies the size of the multicast transmission buffer in accordance with the obtained size; and the processor searches through the transmission buffer storage table, and stores the received packet in the multicast transmission buffer, and the group address and the transmission-source address of the received packet in the transmission buffer storage table if the transmission buffer storage table does not contain the address of the received packet, or the processor discards the received packet if the transmission buffer storage table contains the address of the received packet.

7. A multicast packet control apparatus according to claim 6, wherein the multicast transmission buffer comprises a plurality of group address buffers corresponding to group addresses;

the transmission buffer size modification table further stores the group addresses in relation to the utilization rate of the multicast transmission buffer and the size of the multicast transmission buffer;

the processor monitors the utilization rate of each of the group address buffers; and the processor obtains the size of the multicast transmission buffer in accordance with the monitored utilization rate of the buffer and the utilization rate of the multicast transmission buffer stored in the transmission buffer size modification table, corresponding to the group address of the received packet, and modifies the size of the group address buffer in accordance with the obtained size.

8. A multicast packet control apparatus according to claim 6, wherein the multicast transmission buffer comprises a plurality of group address buffers corresponding to group addresses;

the transfer limitation table further stores the group addresses in relation to the utilization rate of the multicast transmission buffer and the transfer rate limitation information; and the processor monitors the utilization rate of each of the group address buffers, compares the monitored utilization rate with the utilization rate of the multicast transmission buffer specified in the transfer limitation table, in accordance with the group address of the received packet when the response packet is transferred to the group address buffer, obtains corresponding transfer rate limitation information, and limits the number of packets transferred from the group address buffer to the packet transfer apparatus or the transfer rate in accordance with the transfer rate limitation information if a limitation is needed.

9. A multicast packet control apparatus according to claim 6, wherein the processor releases the limitation imposed on transfer from the multicast transmission buffer to the packet transfer apparatus if the monitored utilization rate of the multicast transmission buffer falls below the specified value.

10. A multicast packet control apparatus according to claim 6, wherein the request packet is a join request packet or a leave statement packet.

* * * * *